(12) United States Patent  (10) Patent No.: US 9,073,471 B1
McIntosh  (45) Date of Patent: Jul. 7, 2015

(54) FOLDAWAY CART FOR WHEELCHAIR STOWAGE ABOARD A COMMERCIAL AIRCRAFT

(71) Applicant: The Boeing Company, Chicago, IL (US)

(72) Inventor: Darren C. McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/247,318

(22) Filed: Apr. 8, 2014

(51) Int. Cl.
  *B62D 39/00* (2006.01)
  *B60P 3/07* (2006.01)
  *B60R 13/00* (2006.01)
  *B65F 3/00* (2006.01)
  *B60P 3/077* (2006.01)
  *B62B 3/02* (2006.01)

(52) U.S. Cl.
  CPC . *B60P 3/07* (2013.01); *B60R 13/00* (2013.01); *B65F 3/001* (2013.01); *B60P 3/077* (2013.01); *B62B 3/022* (2013.01)

(58) Field of Classification Search
  USPC ............. 280/202–203, 33.991; 414/462, 469, 414/537, 480, 921; 224/42.07, 42.08, 224/42.43, 42.44
  See application file for complete search history.

(56) References Cited

U.S. PATENT DOCUMENTS 4,693,289 A * 9/1987 Taylor et al. ................... 150/166
6,202,722 B1 * 3/2001 Crocker .......................... 150/154

* cited by examiner

*Primary Examiner* — John Walters
*Assistant Examiner* — James Triggs
(74) *Attorney, Agent, or Firm* — Baldauff IP, LLC; Michael J. Baldauff, Jr.

(57) ABSTRACT

A dual-purpose stowage cart for stowing a wheelchair in a stowage bay of an aircraft that was intended to stow a service cart. In at least one configuration, the stowage cart includes a front assembly and a base assembly that are hingedly connected together. When the end assembly is in an upright position, the stowage cart may be used to transport a personally owned wheelchair in an aisle of an aircraft. When the stowage bay is not being used for stowing a service cart, the stowage cart with the wheelchair may be stowed in the stowage bay in place of the service cart. Also, when the end assembly is in the upright position, but the stowage cart is without the wheelchair, the stowage cart may include a waste collection assembly. The waste collection assembly is used to collect disposable waste from the passengers onboard the aircraft.

18 Claims, 15 Drawing Sheets

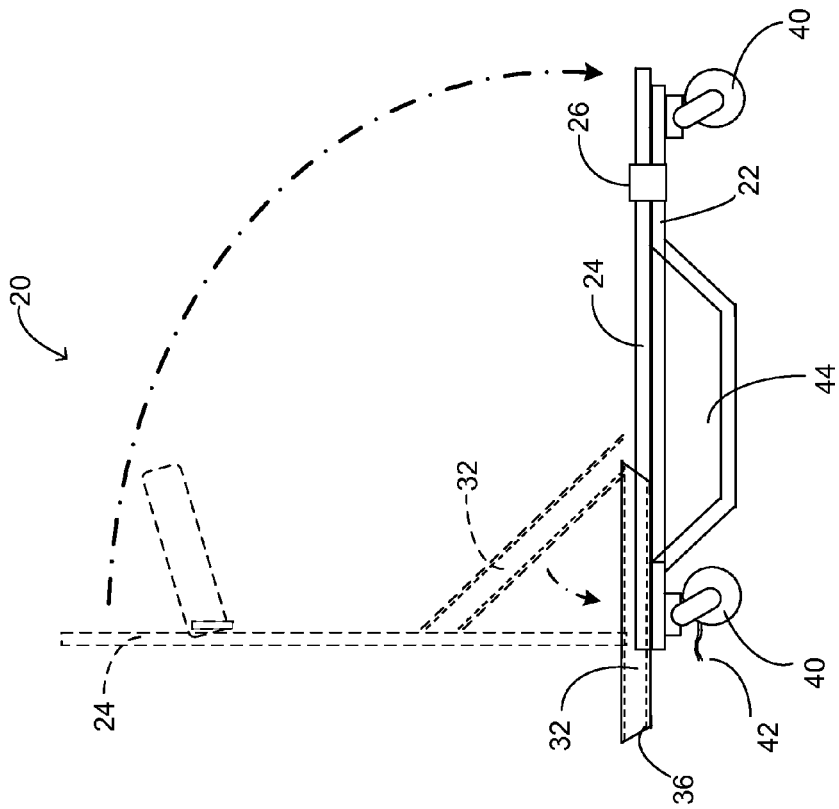
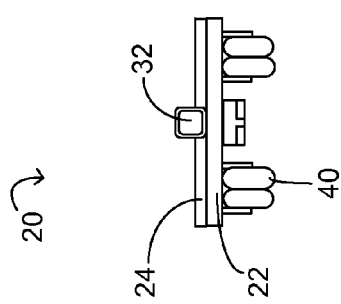
Fig. 4

FOLDAWAY CART FOR WHEELCHAIR STOWAGE ABOARD A COMMERCIAL AIRCRAFT

TECHNICAL FIELD

The field of the embodiments presented herein relate to a foldaway stowage cart configured to transport and stow a wheelchair aboard a commercial aircraft and, in particular, to stowing the cart and wheelchair within a bay typically used for stowing a meal or beverage cart in a galley of the commercial aircraft.

BACKGROUND

Commercial aircraft have meal and beverage carts for providing meal and beverage service to passengers aboard the aircraft. The cart is wheeled and configured to travel up and down the aisles between the rows of seats. When not in use, each cart is stowed in a bay specifically configured to accommodate the cart. The galleys within the aircraft typically have multiple bays for stowing multiple carts. Retention devices secure and retain the cart within its bay.

Presently, passengers requiring use of a wheelchair are not able to use their own personal wheelchair. An agent of the airline or the airport temporarily provides a wheelchair that the passenger uses through the airport and down the ramp to the passenger entry door of the aircraft. Some commercial aircraft then have a narrow wheelchair specifically configured to move up and down the aisles of the aircraft so that the passenger can get to their assigned seat and then depart the aircraft when their destination is reached. This narrowly configured wheelchair is not intended for use other than onboard the aircraft and therefore is permanently retained onboard the aircraft.

Once the passenger departs the aircraft, another wheelchair is brought to the passenger entry door so that the passenger can travel from the arrival gate and through the airport. Thus, while traveling though the arrival and departure airports passengers cannot use their personal-owned wheelchair because there is not stowage space available onboard the aircraft for stowing the personally-owned wheelchairs. However, new Department of Transportation (DOT) rules are requiring commercial airlines to provide stowage space for personally-owned wheelchairs.

Also, passengers traveling by commercial air typically generate a lot of waste material that the flight attendants pick up just before the aircraft lands at the destination airport. Typically the flight attendants walk up and down the aisles with plastic bags to put the waste material in. This takes a significant amount of time and the flight attendants often get their hands and clothes soiled. Once the waste material is collected from the passengers, the flight attendants must then sort the waste material by hand in the galley or, alternatively, the filled plastic bags are transported to a sorting facility. Thus, when collecting the waste material onboard an aircraft the waste material is not collected in a manner best suited for recycling.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a stowage cart for use onboard an aircraft is provided. The stowage cart is configured to be stowed in a stowage bay of the aircraft where a service cart would typically be stowed. The stowage cart includes a base assembly and an end assembly and is configured to receive and retain a collapsed wheelchair thereon. The stowage cart with the collapsed wheelchair thereon is configured to be received within the stowage bay.

According to another embodiment disclosed herein, a foldable stowage cart for use onboard an aircraft having a stowage bay configured for receiving a service cart is provided. The foldable stowage cart includes a base assembly and an end assembly hingedly secured to one another. The end assembly is configurable into an upright position for the foldable stowage cart to receive and retain a collapsed wheelchair thereon and into a collapsed position when the foldable stowage cart is not to receive and retain the collapsed wheelchair thereon. The foldable stowage cart with the end assembly in the upright position and with the collapsed wheelchair thereon is configured to travel up and down an aisle of the aircraft and be received within the stowage bay. Also, the stowage cart with the end assembly is in the collapsed position is configured to be stowed without the wheelchair.

According to yet another embodiment disclosed herein, a method for receiving a collapsed wheelchair within a stowage bay that has been configured for a service cart onboard an aircraft is provided. The method includes collapsing a personally owned wheelchair. The method then includes receiving and retaining the personally owned wheelchair on a stowage cart. The method also includes moving the stowage cart with the personally owned wheelchair thereon through an aisle of the aircraft and receiving and retaining the stowage cart with the personally owned wheelchair thereon in the stowage bay. The method may also include removing the personally owned wheelchair from the stowage cart and receiving and retaining a waste collection assembly on the storage cart in place of the personally owned wheelchair. The method then may also include collecting disposable waste within a fire containment bag of the waste collection assembly.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 4 illustrates front and side views of the stowage cart wherein the stowage cart is folded according to at least one embodiment disclosed herein;

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to a stowage cart configured to transport and stow a wheelchair aboard a commercial aircraft and, in particular, to stowing the cart and wheelchair within a stowage bay typically used for stowing a meal or beverage cart in a galley of the commercial aircraft. The present disclosure is susceptible of embodiment in many different forms.

Figure 1:
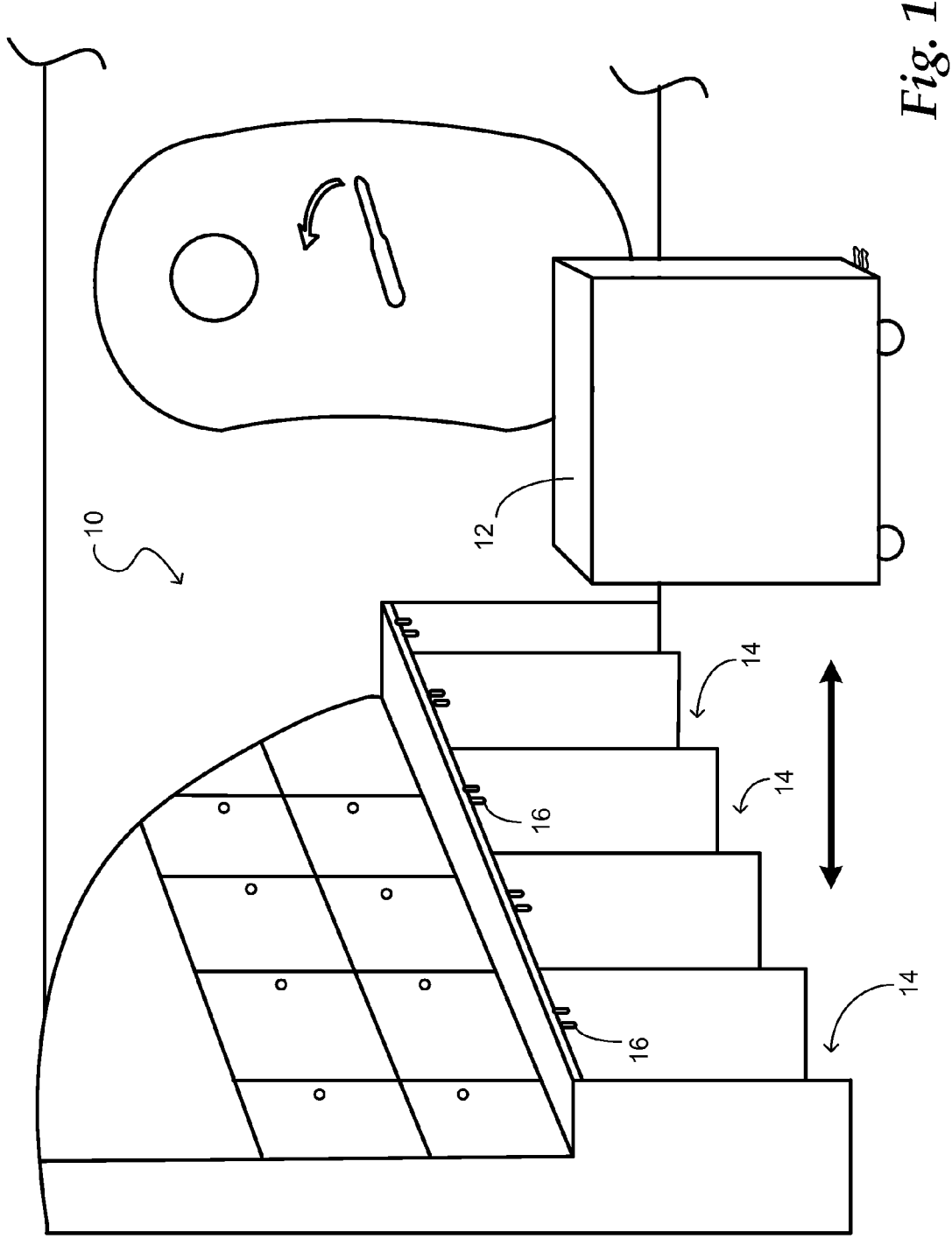
FIG. 1 illustrates a perspective view of a portion of a galley of an aircraft where a meal or beverage cart is received and retained within a bay specifically sized to accommodate the meal or beverage cart.

Meal and beverage carts are wheeled and configured to travel up and down the aisles between the rows of seats onboard commercial aircraft and the galleys within the aircraft typically have multiple stowage bays for stowing the meal and beverage carts when not in use. FIG. 1 illustrates a perspective view of a portion of a galley 10 where a meal and beverage cart 12 is received and retained within a stowage bay 14 specifically sized to accommodate the meal or beverage cart 12. However, the commercial airlines have reduced the amount of meal and beverage service provided to passengers. Because the meal and beverage carts 12 on existing commercial aircraft are not used as often as they had been, the space within the stowage bays 14 may be used during a flight to store other than the meal and beverage carts 12.

For simplicity, a meal and beverage cart 12 may be generally referred to as a "service cart 12." There are two main sizes of service carts 12 in use with the airlines around the world called "ATLAS" and "KSSU" sizes. ATLAS is by far the most common size and therefore will be used as the primary example. However, the embodiments described herein are not limited to use within stowage bays 14 configured for ALTAS sized service carts 12. The stowage bays 14 typically are uniformly configured so that any service cart 12 may be received within any one of the stowage bays 14. Also, the service carts 12 are stowed side-by-side and are separated by T-dividers or partition walls which define the stowage bays. Each stowage bay 14 includes retention devices 16 for securing and retaining the service carts 12 within the stowage bays 14. For example, the retention devices 16 commonly referred to as "¼ turn retainers" on the upper and lower face of the galley are turned a quarter turn to prevent the service cart 12 from rolling out of the stowage bay 14 and for retention during crash loads.

For example, ATLAS sized service carts 12 have a width of approximately 11.84 inches, a length of approximately 33.30 inches, and a height of approximately 40.55 inches. The stowage bays 14 for use with ATLAS sized service carts 12 have a width of approximately 12.83 inches, a length of approximately 34.10 inches, and a height of approximately 41.25 inches. Therefore, the dimensions of the stowage bay 14 allow for ATLAS sized service carts 12 to be received within the stowage bays 14. However, as described below, the stowage bays 14 may be used for another purpose when not being used by the service carts 12.

A new Department of Transportation (DOT) rule, 14 CFR 382.67, which is incorporated herein by reference in its entirety, generally requires that priority space be provided on aircraft for stowing personally owned wheelchairs. In particular, the priority space must be sufficient to stow a passenger's personally owned wheelchair within 13 inches by 36 inches by 42 inches. When comparing the priority space requirements with the dimensions of the stowage bay 14, it can be seen that the dimensions of the stowage bay 14 fall very close to the priority space requirements. Moreover, a typical personally owned wheelchair has a width of approximately 11.5 inches to 12.05 inches and a height of approximately 35.05 inches. With the footrests removed, the length of the personally owned wheelchair is approximately 32.00 inches. Thus, the dimensions of a personally owned wheelchair are typically less than the dimensions of the stowage bay 14. In one or more configurations, a personally owned wheelchair may be best suited to be stowed in a stowage bay that stows two service carts 12 side-by-side with a T-divider between. These double stowage bays are typically approximately 24.83 inches wide. A comparison of the dimensions of the personally owned wheelchair, the service cart 12, the priority space requirements, and the stowage bay 14 is shown in Table 1 below.

TABLE 1

Wheelchair Fitment Comparison:

| Dimensions | Wheelchair (Inches) | ATLAS Service Cart (Inches) | Priority Space Requirement per 14 CFR 382.67 (Inches) | Calculated Stowage Bay Size (Inches) |
|---|---|---|---|---|
| Width | 11.50 to 12.05 | 11.84 | 13.00 | 12.83 |
| Length | 32.00 | 33.30 | 36.00 | 34.10 |
| Height | 35.05 | 40.55 | 42.00 | 41.25 |

Presently, passengers requiring use of a wheelchair are not permitted to take their own personal wheelchairs along an entire course of a trip. Instead, an airline or airport agent provides a wheelchair that the passenger uses temporarily through the departure airport and down the ramp to the passenger entry door of the aircraft. Some commercial aircraft then have a narrow wheelchair specifically configured to move up and down the aisles of the aircraft so that the passenger can get to their assigned seat and then depart the aircraft when their destination is reached. This narrowly configured wheelchair is not intended for use other than onboard the aircraft and therefore is permanently retained onboard the aircraft so that several different passengers may use the narrow wheelchair.

Once the passenger departs the aircraft at a connecting airport or at the destination airport, another wheelchair is brought to the passenger entry door by another airline or airport agent for the passengers temporary use so that the passenger can travel from the arrival gate through the airport. Thus, while traveling through the departure, destination and connecting airports, passengers cannot use their personally owned wheelchair because there is not stowage space available onboard the aircraft for stowing their personally owned wheelchairs.

Figure 2:
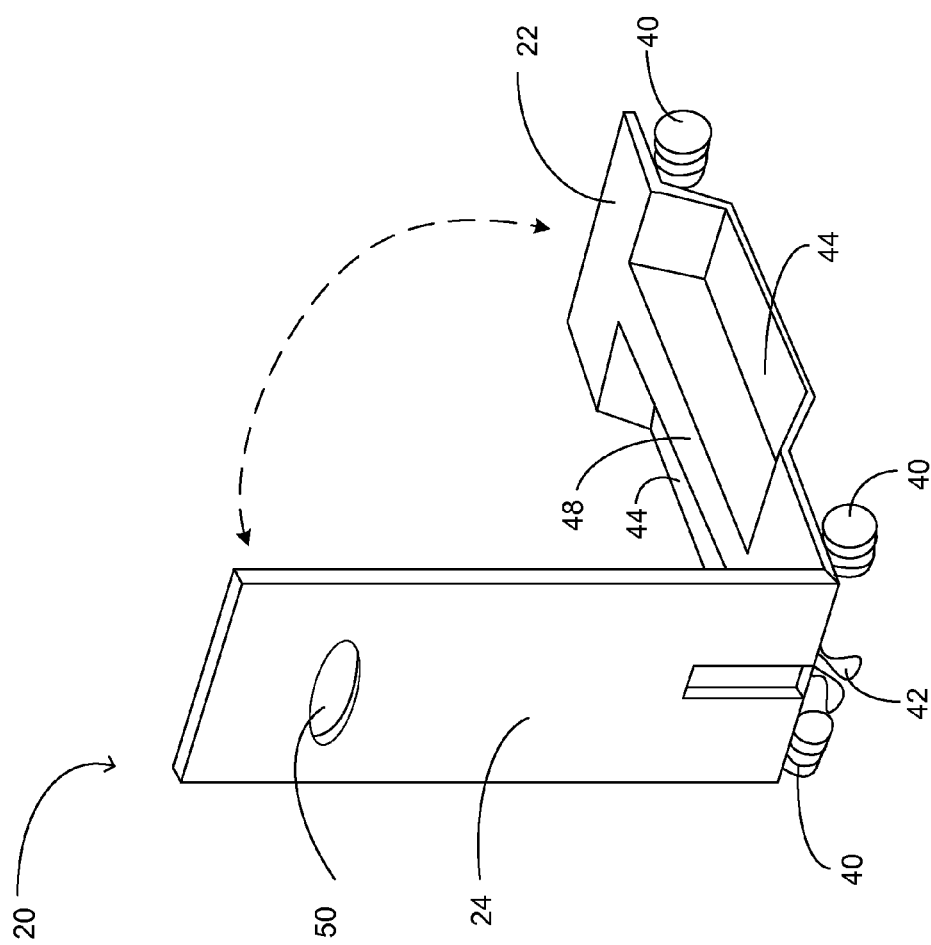
FIG. 2 illustrates a perspective view of a foldable stowage cart for stowing a personally owned wheelchair according to at least one embodiment disclosed herein.
Figure 3:
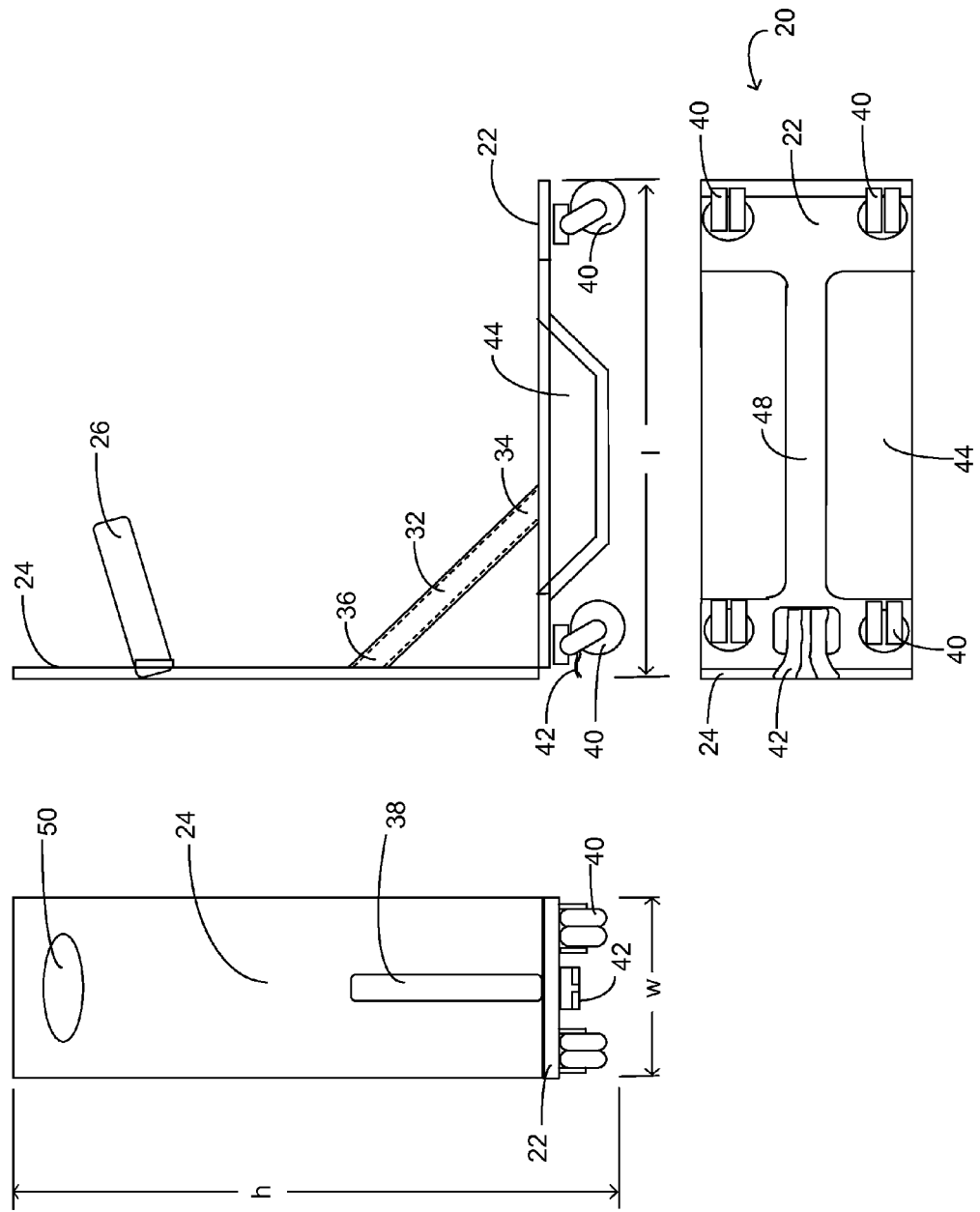
FIG. 3 illustrates a front, side and bottom view of the foldable stowage cart of FIG. 2 according to at least one embodiment disclosed herein.

FIG. 2 illustrates a perspective view of a foldable stowage cart 20 for stowing a passenger's personally owned wheelchair according to one or more configurations. Also, FIG. 3 illustrates front, side and bottom views of the stowage cart 20 shown in FIG. 2. The stowage cart 20 includes a base assembly 22 and an end assembly 24. The stowage cart 20 has a maximum height "h", maximum length "l" and a maximum width "w." The maximum dimensions of the stowage cart 20 should not exceed the standard dimensions of the service cart 12 and, therefore, the maximum height "h", maximum length "l", and maximum width "w" of the stowage cart 20 should be no more than the height, length and width dimensions of the service cart 12 as shown in Table 1 above. In at least one configuration, the maximum dimensions of the height "h", length "l", and width "w" of the stowage cart 20 would be about 40.55 inches, 33.30 inches, and 11.84 inches, respectively.

In at least one configuration, the base assembly 22 and the end assembly 24 are hingedly secured to one another with a hinge. The hinge connects one end of the base assembly 22 to an end of the end assembly 24 so that the end assembly 24 can pivot into an upright position. The hinge also allows the end assembly 24 to pivot into a collapsed position as shown in FIG. 4. FIG. 4 illustrates front and side views of the stowage cart of FIG. 2 with the end assembly 24 in the collapsed position.

As shown in FIG. 3, one or more configurations of the stowage cart 20 may include a bracing member 32 for diagonally bracing the end assembly 24 in the upright position. The bracing member 32 may be rigid with an end 34 pivotally connected to the base assembly 22 and a distal end 36 detachably secured to the end assembly 24 when the end assembly 24 is in the upright position. The bracing member 32 provides structural rigidity to the stowage cart 20 when the distal end 36 is detachably secured to the end assembly 24 in the upright position. The end assembly 24 may include an elongated opening 38 for allowing the distal end 36 to pass therethrough when the distal end 36 is detached from the end assembly 24 and the end assembly 24 is being pivoted into the collapsed position.

The base assembly 22 of the stowage cart 20 may also include wheels or casters 40 on the bottom so that the stowage cart 20 may roll up and down an aisle of the aircraft in a manner similar to how service carts 12 roll up and down an aisle. Also, the base assembly 22 may also include one or more pedals 42 as part of a braking system for locking the casters 40 in position to prevent the stowage cart 20 from rolling up and down the aisle. A strap 26 such as a seat belt may be used to secure the wheelchair to the end assembly 24 of the stowage cart 20. Strap 26 may also be used to attach end assembly 24 to the base assembly 22 when the stowage cart 20 is collapsed for stowage.

Figure 5:
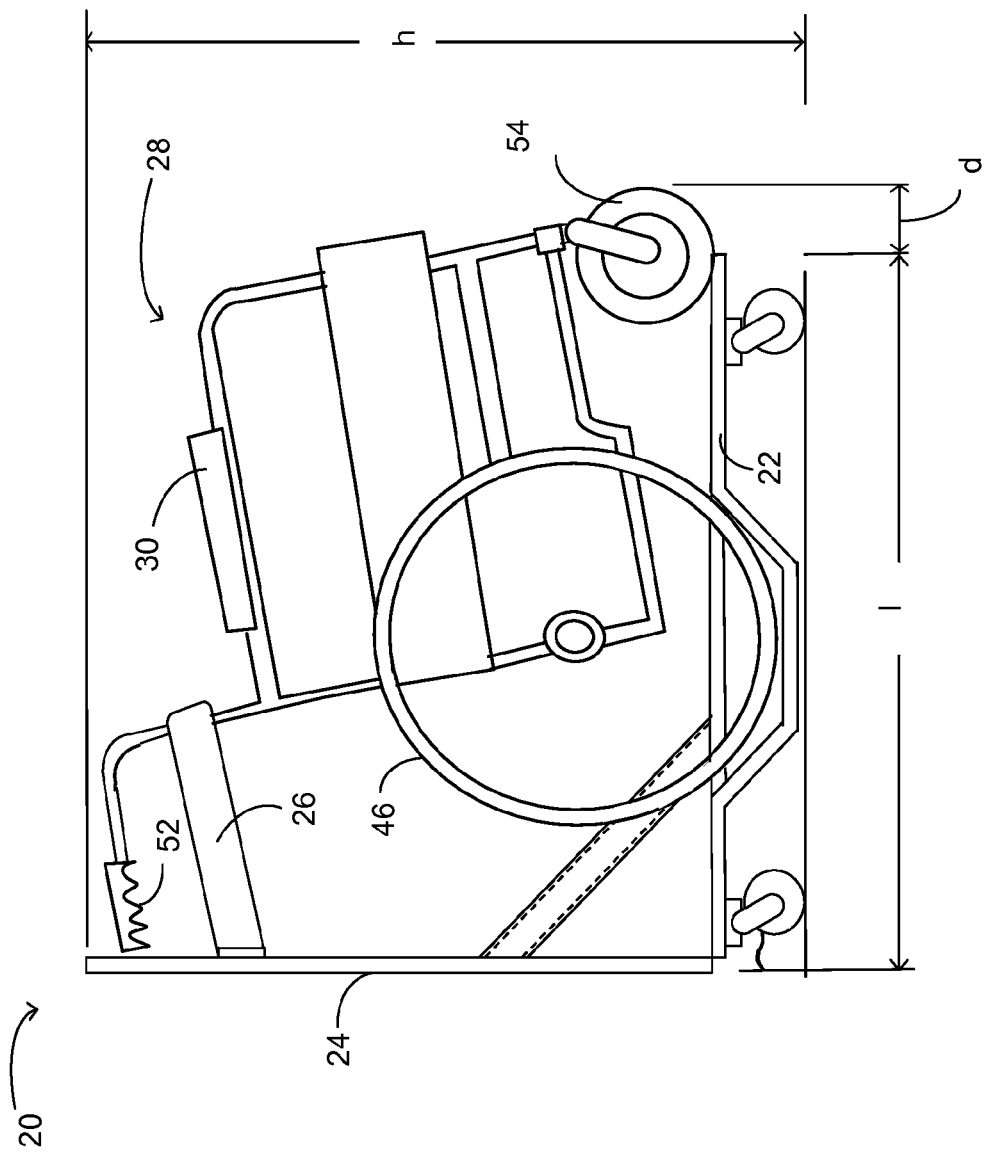
FIG. 5 illustrates a collapsed wheelchair on the foldable stowage cart according to at least one embodiment disclosed herein.
Figure 6:
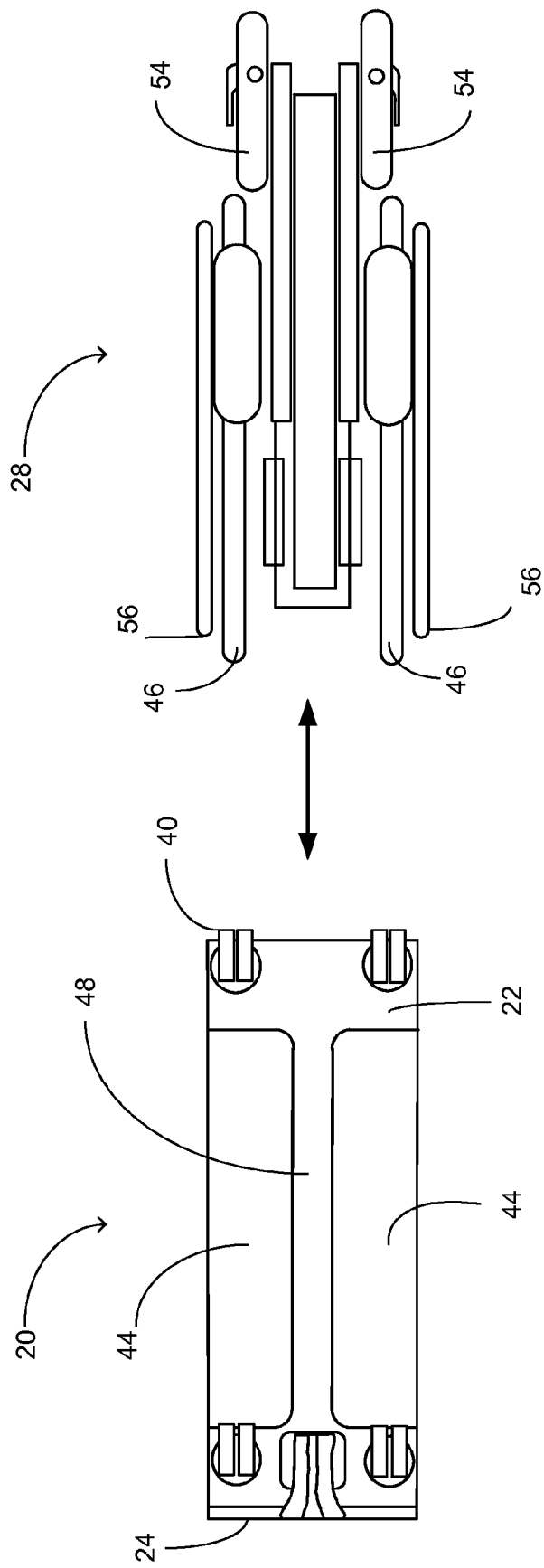
FIG. 6 illustrates a bottom view of the collapsed wheelchair to be placed on the foldable stowage cart according to at least one embodiment disclosed herein.
Figure 7:
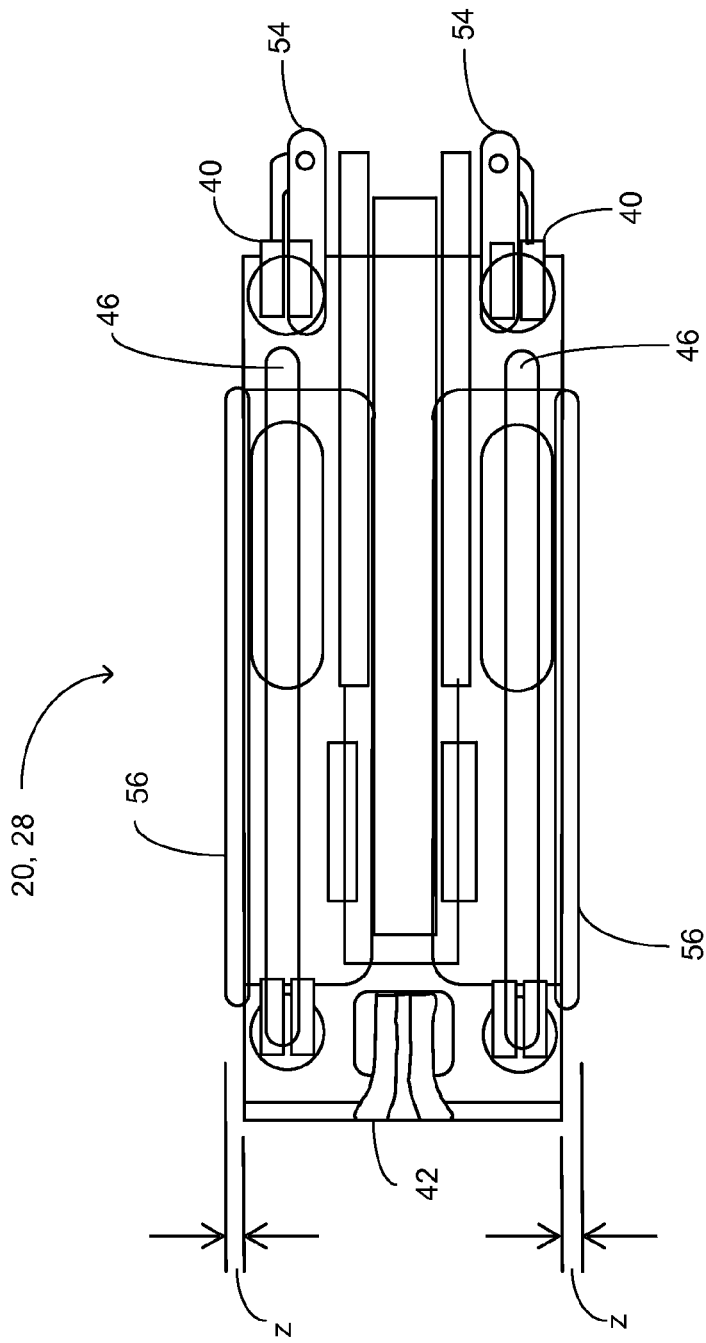
FIG. 7 illustrates a bottom view of the collapsed wheelchair on the foldable stowage cart according to at least one embodiment disclosed herein.
Figure 8:
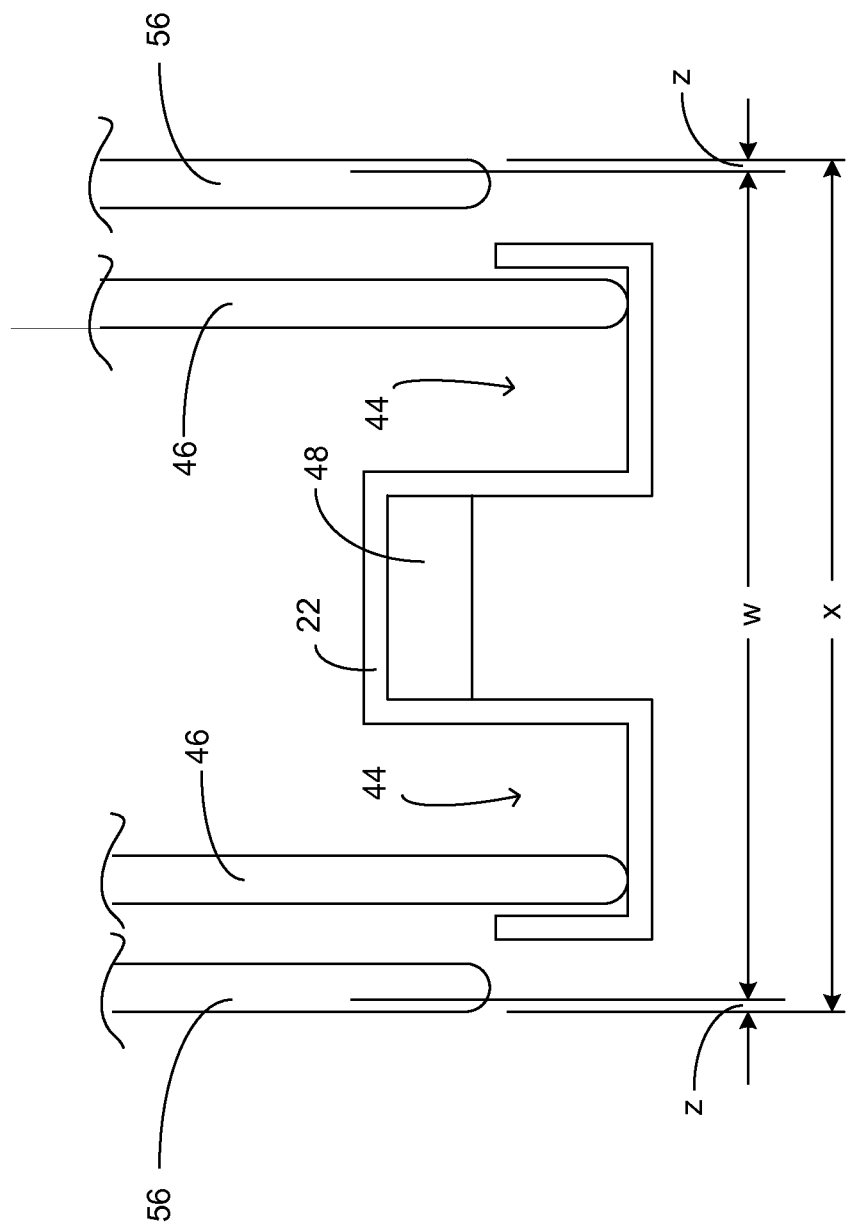
FIG. 8 illustrates a partial end view of the collapsed wheelchair on the foldable stowage cart according to at least one embodiment disclosed herein.

FIGS. 5-8 illustrate the end assembly 24 in the upright position so that the stowage cart 20 is configured to receive and retain a folded or collapsed wheelchair 28. The wheelchair 28 may be most any type of wheelchair that is capable of being collapsed to narrow the width of the wheelchair 28. As best shown in FIG. 5, the wheelchair 28 may include arm rests 30. A portion of the base assembly 22 may be recessed to receive the wheelchair 28. For example, the base assembly 22 may include recessed portions 44 for receiving the rubber tread wheels 46 of the wheelchair 28 as best shown in FIGS. 5 and 8. The recessed portions 44 are positioned approximately in the middle of the base assembly 22 on opposite sides of an elongated narrow portion 48 extending between the front and back of the base assembly 22. The recessed portions 44 also allow the wheelchair 28 to sit lower than the height "h" of the stowage cart 20. If necessary, as shown in FIGS. 2 and 3, the end assembly 24 may have an opening 50 for allowing the handles 52 of the wheelchair 28 to extend or pass through the end assembly 24 and therefore reduce the amount that the wheelchair 28 extends or hangs off the back of the stowage cart 20. The front wheels 54 extend or hangs off the back of the stowage cart 20 by a distance "d" as shown in FIG. 5.

FIG. 6 illustrates a bottom view of the wheelchair 28 when collapsed and about to be placed on the stowage cart 20. FIG. 7 then illustrates a bottom view of the collapsed wheelchair 28 placed on the stowage cart 20. The wheelchairs 28 may collapse or fold to define a wheelchair width "x." Because of the difference in how the wheelchairs 28 are designed, most wheelchairs 28 when collapsed have a width "x" of about 11.50 inches to about 12.05 inches. Therefore, some of the wheelchairs 28 when placed upon the stowage cart 20 may fit within the width "w" or may extend beyond the width "w" of the stowage cart 20. For example, one or more configurations of the collapsed wheelchair 28 may have a width "x" that fits within the width "w" of the stowage cart 20 by about 0.17 inches or have a width "x" that overhangs the width "w" of the stowage cart 20 by about 0.105 inches. FIG. 8 illustrates a partial end view of a collapsed wheelchair 28 having a width "x" on the stowage cart 20 having a width "w" where a portion of the hand grip wheels 56 of the collapsed wheelchair 28 overhangs by a distance "z" on each side of the base assembly 22. FIG. 7 also illustrates the distance "z" between the hand grip wheels 56 on each side of the base assembly 22.

Figure 9:
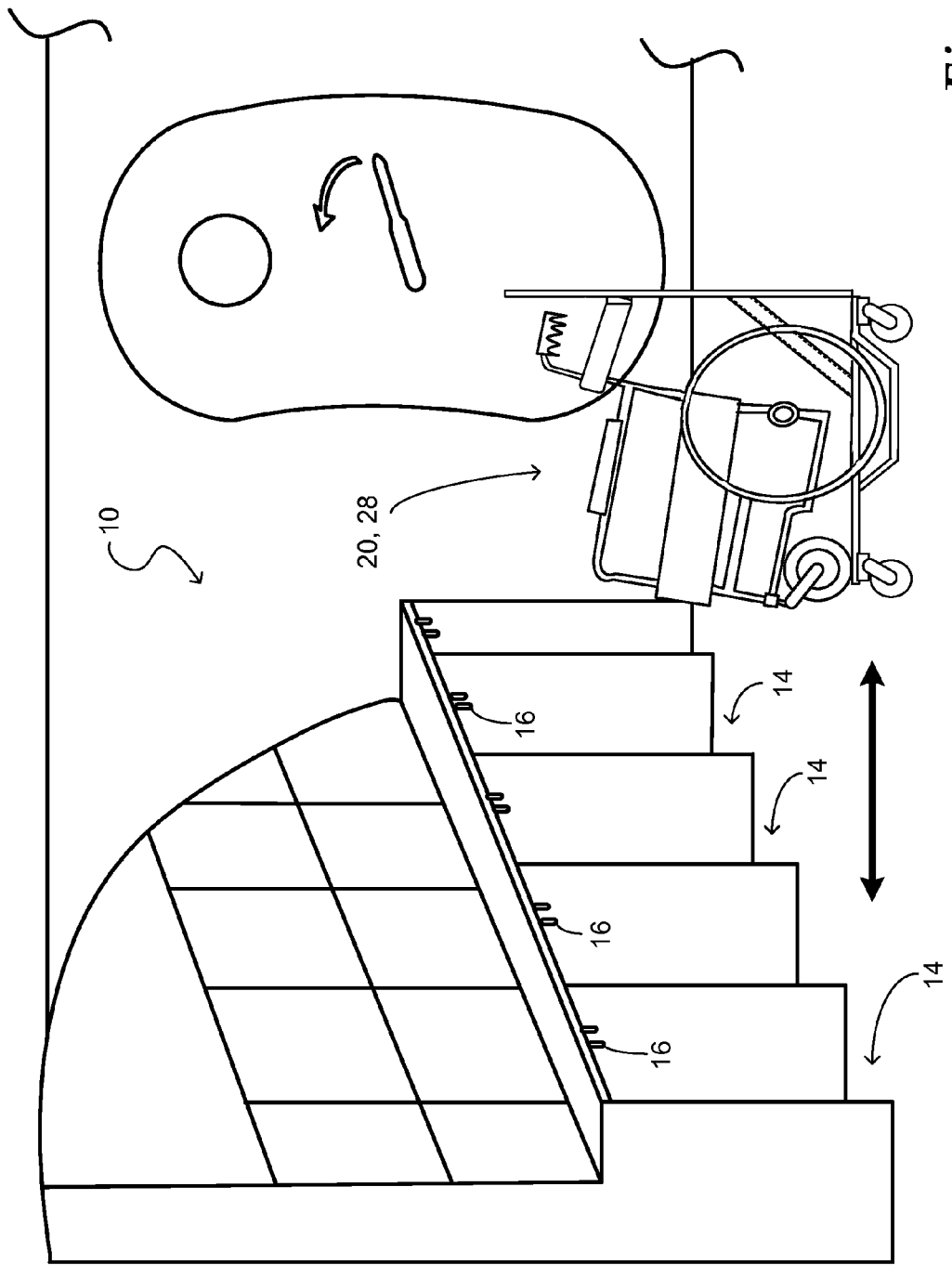
FIG. 9 illustrates a perspective view of the portion of the galley of an aircraft of FIG. 1 wherein a bay specifically configured to accommodate the meal or beverage cart instead receives and retains the collapsed wheelchair on the foldable stowage cart according to at least one embodiment disclosed herein.

FIG. 9 illustrates a perspective view of the portion of the galley 10 of the aircraft. Rather than depicting the service cart 12 being stowed in the stowage bay 14 as shown in FIG. 1, FIG. 9 depicts the stowage cart 20 with the wheelchair 28. The stowage cart 20 with the wheelchair 28 thereon may be received and retained within the stowage bay 14 in place of the service cart 12. Some stowage bays 14 may include rub strips or cart stops that may be removed or relocated to provide additional space for stowage of the stowage cart 20 within the stowage bay 14.

Figure 10:
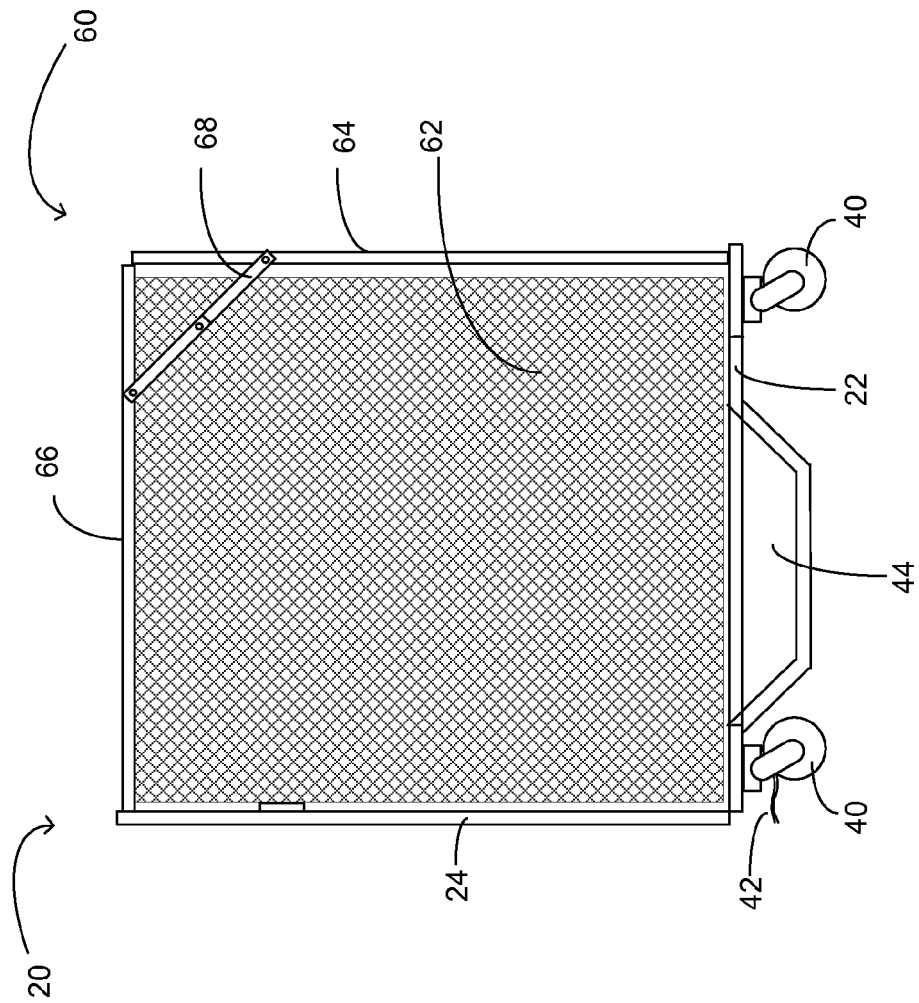
FIG. 10 illustrates the stowage cart reconfigured for separating disposable waste material when not used for stowing the collapsed wheelchair according to at least one embodiment disclosed herein.

When not being used to stow personally owned wheelchairs 28 onboard the aircraft, the stowage cart 20 may be configured for collecting and separating disposable waste material. FIG. 10 illustrates one configuration of the stowage cart 20 configured for collecting and separating disposable waste material. To configure the stowage cart 20 for collecting and separating disposable waste material, the stowage cart 20 may include a waste collection assembly 60 and a container for collecting disposable waste such as a fire containment bag 62. The fire containment bag 62 includes a fire retardant which reduces flammability or delays combustion of materials placed within the fire containment bag 62. In order to contain possible fires, the fire containment bag 62 forms a sealed chamber that reduces the risk of fires. In other words, waste collection assembly 60 is designed to contain fires that may occur if flammable material is received in the fire containment bag 62. For example, the fire containment bag 62 is configured such that a fire within the fire containment bag 62 will self-extinguish.

Figure 11:
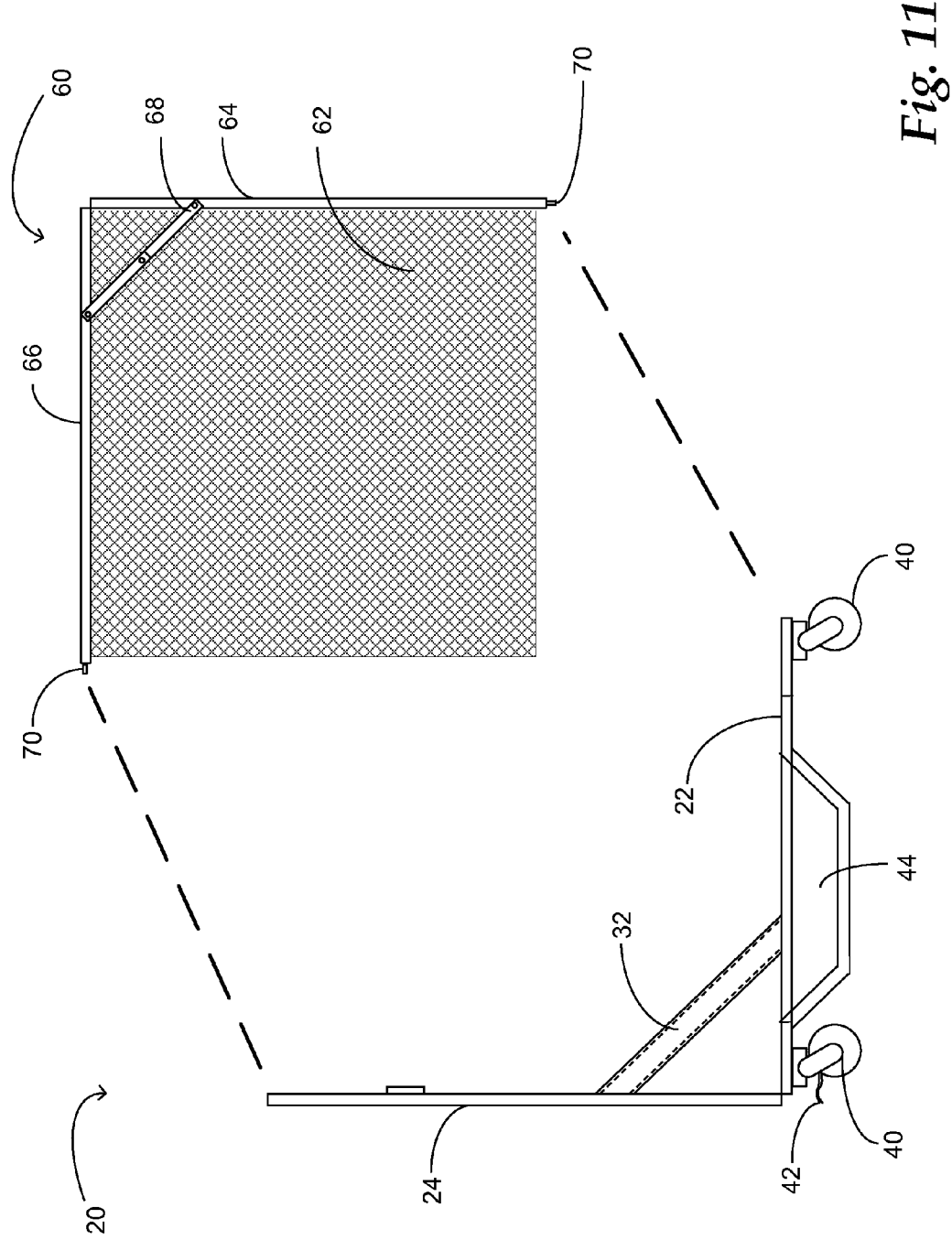
FIG. 11 illustrates a partially exploded view of the stowage cart with a waste collection assembly and a fire containment bag according to at least one embodiment disclosed herein.
Figure 13:
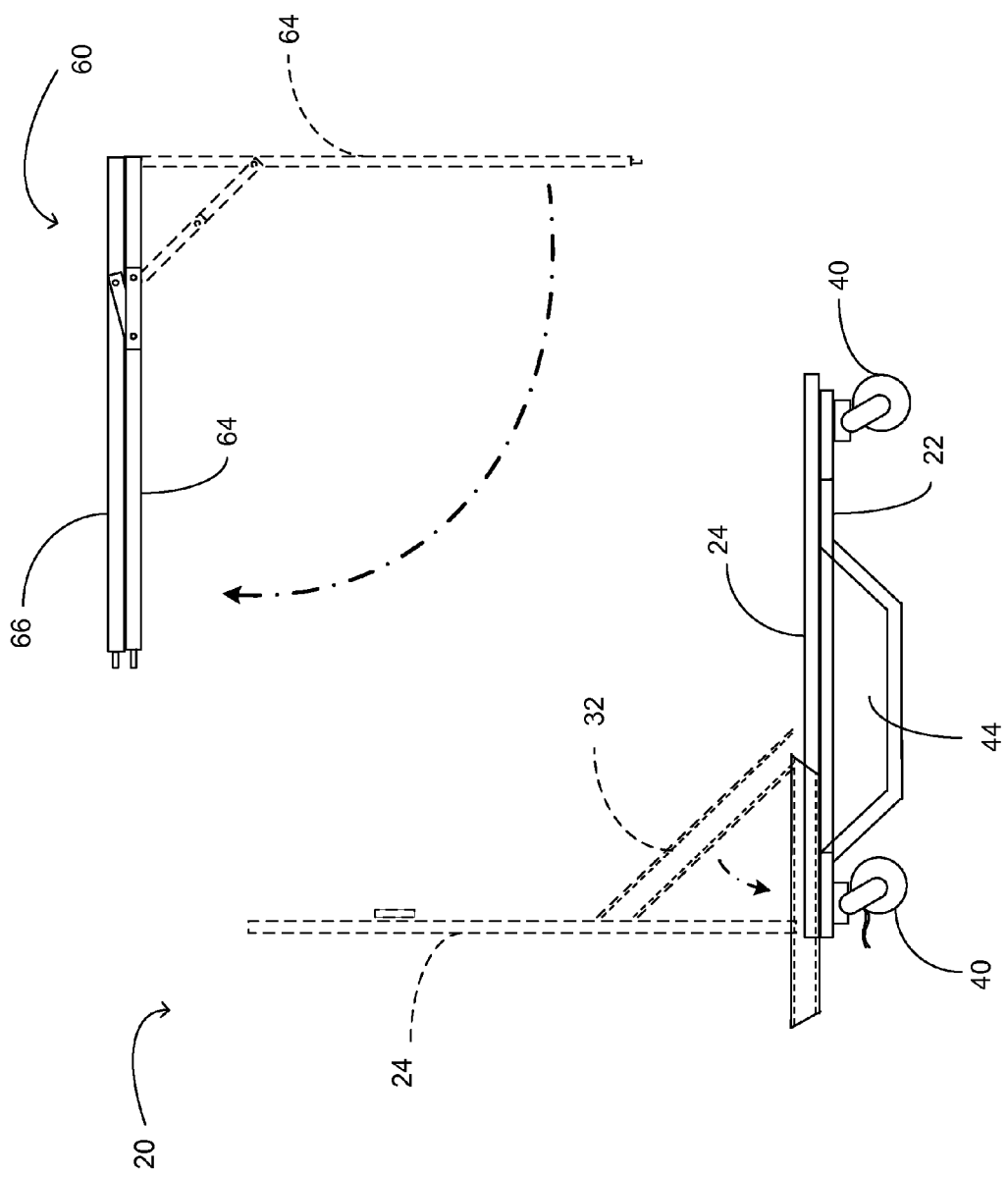
FIG. 13 illustrates a partially exploded view of the stowage cart and the waste collection assembly in collapsed positions according to at least one embodiment disclosed herein.

In at least one configuration, the waste collection assembly 60 may include a first member 64 and a second member 66 to provide a frame for structurally supporting the fire containment bag 62. The first member 64 raises the fire containment bag 62 vertically above the base assembly 22 and the second member 66 holds the fire containment bag 62 open at the top to receive the disposable waste material. The first and second members 64, 66 are preferably hingedly connected to one another so that the waste collection assembly 60 is collapsible. The hinge allows pivoting the first member 64 from a substantially vertical position to a substantially horizontal position in order to collapse the waste collection assembly 60 when not being used (FIG. 13). Also, each side of the waste collection assembly 60 may include a locking brace 68. As best shown in FIG. 11, with the waste collection assembly 60 and the fire containment bag 62 removed from the stowage cart 20, distal ends of the first and second members 64, 66 may include mechanical fasteners to connect the waste collection assembly 60 to the stowage cart 20. In one or more configurations, mechanical fasteners such as locating pins 70 are used to connect the first member 64 to the base assembly 22 and to connect the second member 66 to the end assembly 24.

Figure 12:
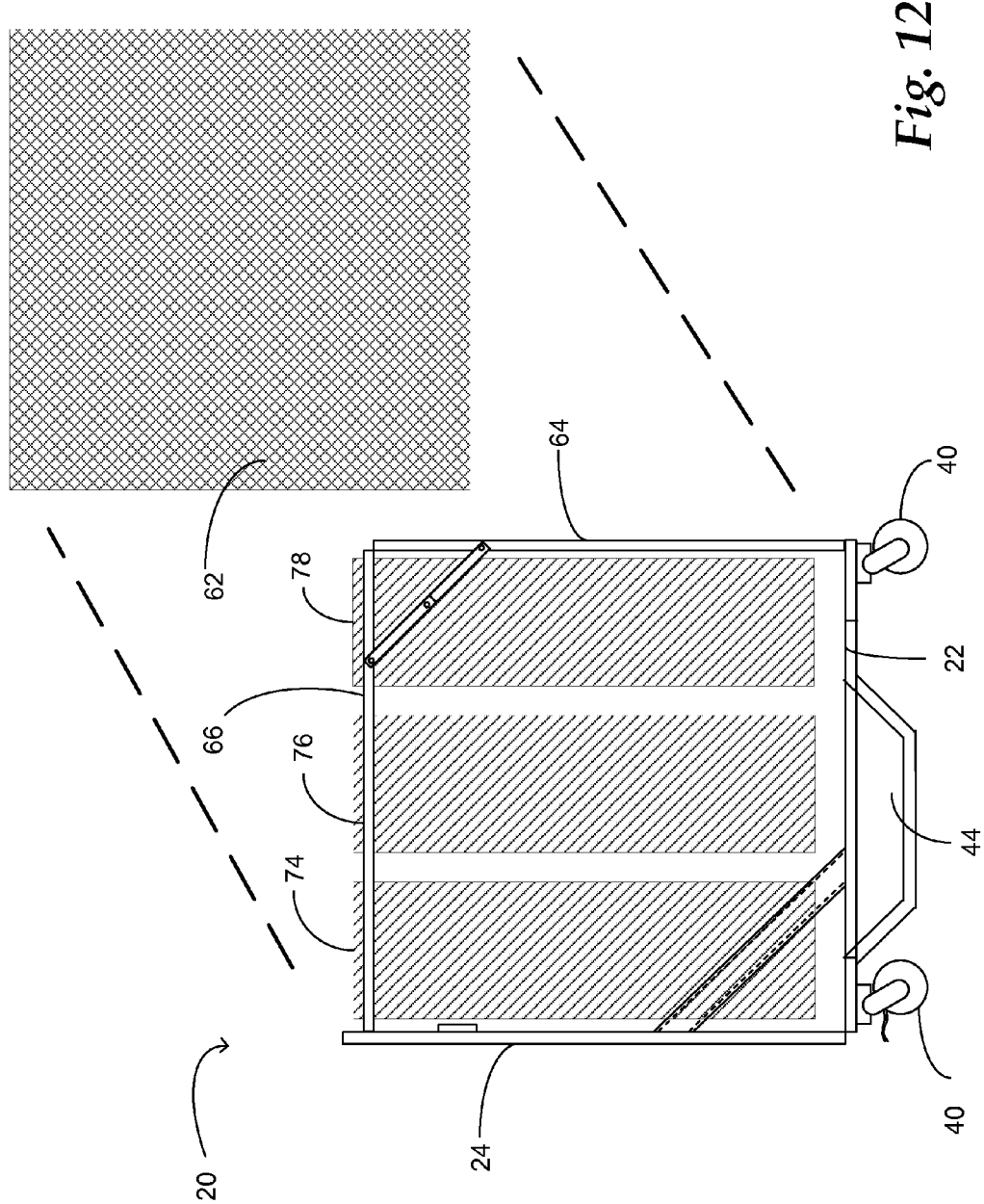
FIG. 12 illustrates a partially exploded view with the fire containment bag removed to show three bags within the fire containment bag for separating disposable waste material according to at least one embodiment disclosed herein.

FIG. 12 illustrates a partially exploded view with the fire containment bag 62 removed to show three sorting containers such as bags 74, 76, 78. The three bags 74, 76, 78 are used for separating waste material placed within the fire containment bag. FIG. 13 illustrates a partially exploded view of the stowage cart 20 with the end assembly 24 in the collapsed position and the first member 64 of the waste collection assembly 60 in the collapsed position.

Figure 14:
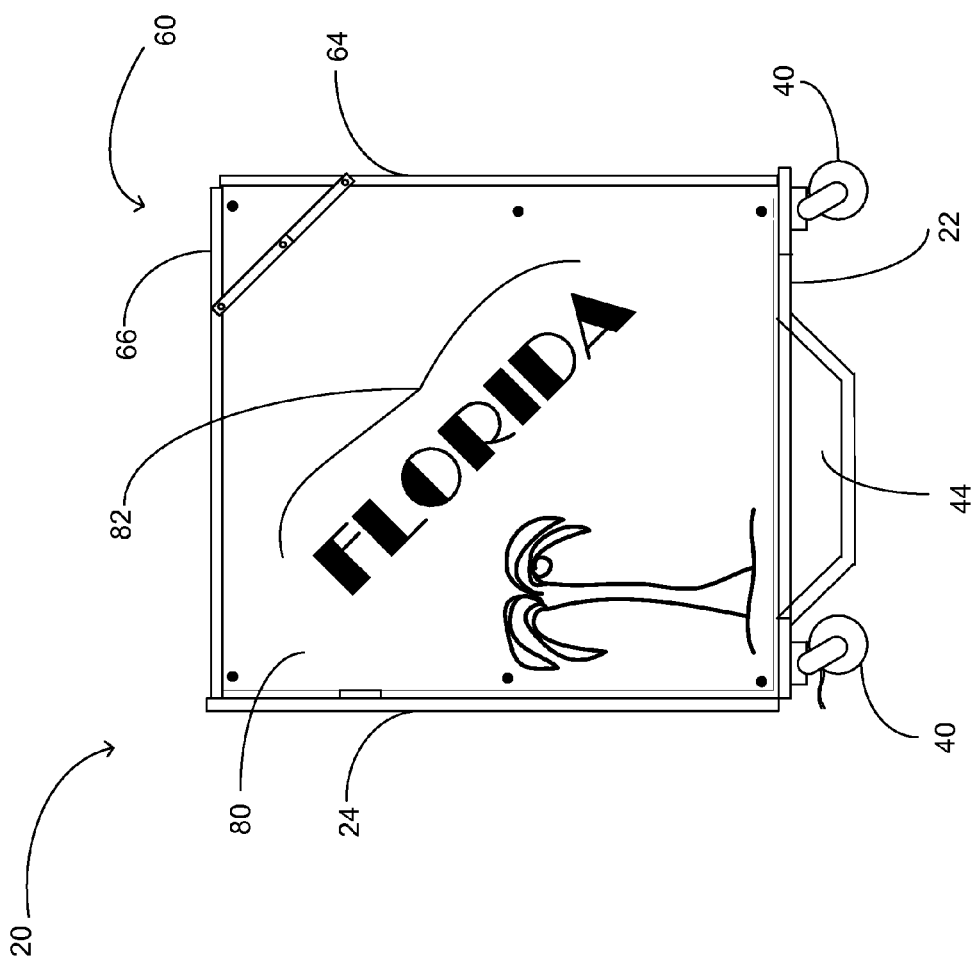
FIG. 14 illustrates a side view of the stowage cart when used for separating disposable waste material having a side panel for advertisements and for preventing the fire containment bag from bulging when filled with disposable waste materials according to at least one embodiment disclosed herein.

FIG. 14 illustrates a side view of the stowage cart 20, when configured for collecting and separating disposable waste material, including at least one side panel 80. Preferably there is a side panel 80 along each side of the stowage cart 20 providing structural support to the waste collection assembly 60. When the bags 74, 76, 78 are being filled with disposable waste materials, the side panels 80 preclude the bags 74, 76, 78 from expanding or bulging beyond the width "w" of the stowage cart 20 so that the stowage cart 20 may continue to travel up and down the aisles of the aircraft to collect additional disposable waste materials from the passengers without contacting the rows of seats.

In one or more configurations, the side panel 80 may include indicia such as an advertisement 82. For example, the advertisement 82 may include the destination of the aircraft. A particular side panel 80 advertising for the destination of an earlier flight may be replaced with another side panel 80 with advertising corresponding with another destination of the current or upcoming flight of the aircraft.

Figure 15:
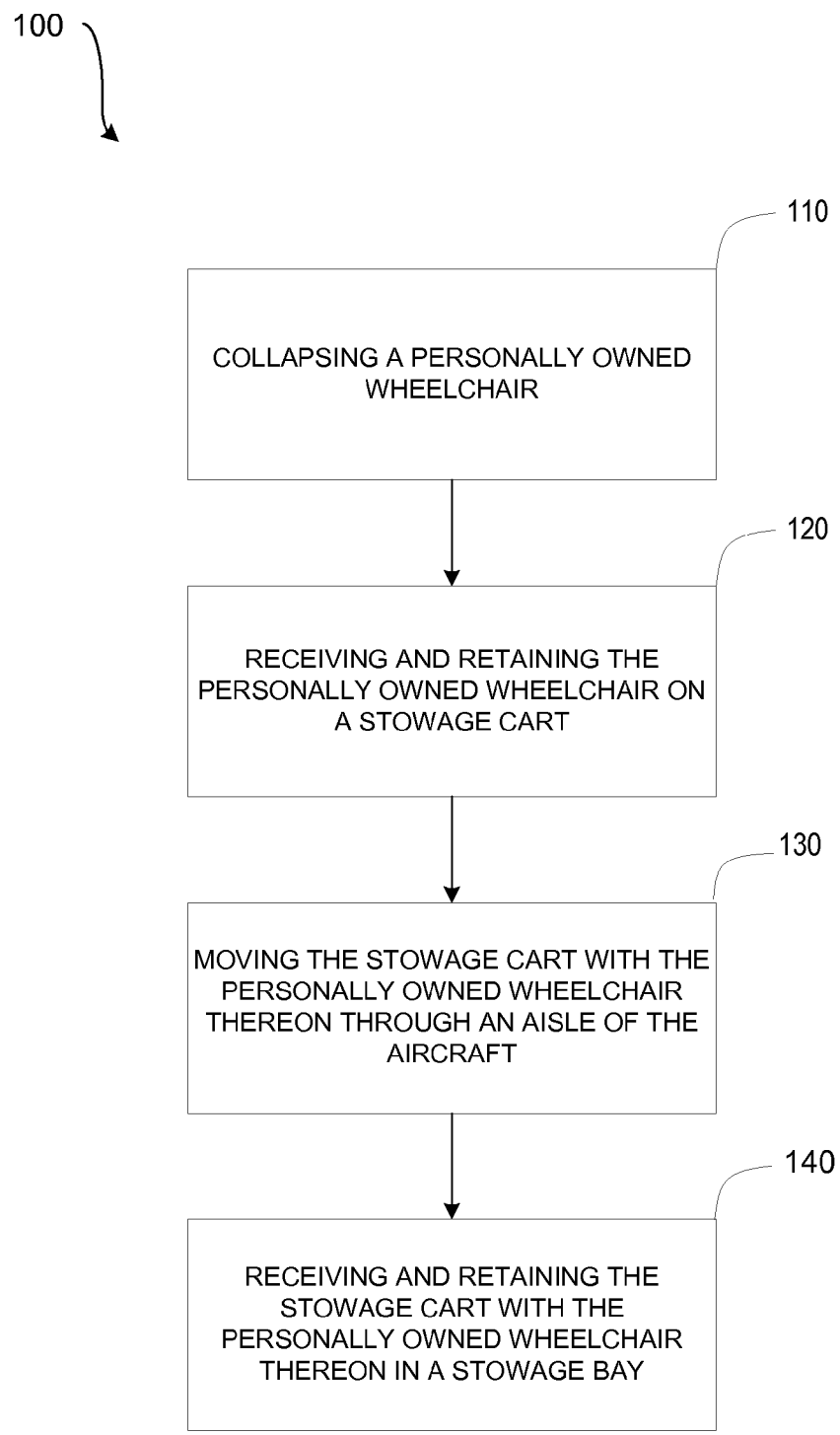
FIG. 15 illustrates one configuration of a method for receiving a collapsed wheelchair within a stowage bay that has been configured for a service cart onboard an aircraft according to at least one embodiment disclosed herein.

FIG. 15 illustrates a method 100 for receiving the collapsed wheelchair 28 within the stowage bay 14 which had been configured for stowing a service cart 12 onboard an aircraft. Unless otherwise indicated, more or fewer operations may be performed than shown in the figures and described herein. Additionally, unless otherwise indicated, these operations may also be performed in a different order than those described herein.

The method 100 starts at operation 110 with collapsing a personally owned wheelchair 28 as the passenger boards the aircraft. Next, the method 100 includes operation 120 for receiving and retaining the personally owned wheelchair 28 on the stowage cart 20. Operation 130 includes moving the stowage cart 20 with the personally owned wheelchair 28 thereon through an aisle of the aircraft. Operation 140 includes receiving and retaining the stowage cart 20 with the personally owned wheelchair 28 thereon in the stowage bay 14 in the galley 10 of the aircraft.

The method 100 may also include a passenger using the personally owned wheelchair 28 while traveling through more than one airport during a trip. Method 100 may also include configuring the end assembly 24 of the stowage cart 20 between an upright position and a collapsed position. The method 100 may also include removing the stowage cart 20 from the stowage bay 14 and receiving and retaining the service cart 12 in the stowage bay 14 in place of the stowage cart 20. The method 100 may also include the operations of removing the personally owned wheelchair 28 from the stowage cart 20 and receiving and retaining a waste collection assembly 60 on the stowage cart 20 in place of the personally owned wheelchair 28 and collecting disposable waste within a fire containment bag 62. The method 100 may then also include stowing the storage cart 20 with the waste collection assembly thereon within the stowage bay 14.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A stowage cart for use onboard an aircraft having a stowage bay configured for receiving a service cart, the stowage cart comprising a base assembly and an end assembly and configured to receive and retain a collapsed wheelchair thereon, wherein the base assembly and the end assembly are hingedly secured to one another, wherein the end assembly of the stowage cart is configured into an upright position for the stowage cart to receive and retain the collapsed wheelchair thereon and into a collapsed position when the stowage cart is not retaining the collapsed wheelchair thereon, and wherein the stowage cart with the collapsed wheelchair thereon is configured to be received within the stowage bay with the end assembly in the upright position.

2. The stowage cart of claim 1, wherein the stowage cart is further configured to be stowed without the collapsed wheelchair when the end assembly is in the collapsed position.

3. The stowage cart of claim 1, wherein a portion of the base assembly is recessed to receive a wheel of the collapsed wheelchair.

4. The stowage cart of claim 3, wherein a maximum height of the collapsed wheelchair when received and retained on the stowage cart is less than a maximum height of the stowage cart.

5. The stowage cart of claim 1, wherein a retention device configured for retaining the service cart in the stowage bay retains the stowage cart in the stowage bay.

6. The stowage cart of claim 1, wherein the stowage cart with the collapsed wheelchair thereon is configured to travel up and down an aisle of the aircraft.

7. The stowage cart of claim 1, wherein a portion of the collapsed wheelchair overhangs the base assembly when the collapsed wheelchair is received and retained on the stowage cart.

8. The stowage cart of claim 1, further comprising a waste collection assembly having a fire containment bag for receiving disposable waste, wherein the waste collection assembly is configured to be received and retained on the stowage cart when the end assembly is in an upright position and the stowage cart is without the collapsed wheelchair.

9. The stowage cart of claim 8, wherein the waste collection assembly is collapsible.

10. The stowage cart of claim 8 further comprising a plurality of sorting containers within the fire containment bag for separating disposable waste.

11. The stowage cart of claim 8, wherein the waste collection assembly further comprises at least one side panel configured to preclude the fire containment bag from expanding beyond a width of the stowage cart.

12. The stowage cart of claim 11, wherein the at least one side panel comprises an advertisement, and wherein the at least one side panel is configured to be replaced for a flight and the advertisement corresponds with a destination of the flight.

13. A foldable stowage cart for use onboard an aircraft having a stowage bay configured for receiving a service cart, the foldable stowage cart comprising a base assembly and an end assembly hingedly secured to one another, the end assembly configurable into an upright position for the foldable stowage cart to receive and retain a collapsed wheelchair thereon and into a collapsed position when the foldable stowage cart is not to receive and retain the collapsed wheelchair thereon, wherein the foldable stowage cart with the end assembly in the upright position and with the collapsed wheelchair thereon is configured to travel up and down an aisle of the aircraft and be received within the stowage bay, and wherein the foldable stowage cart with the end assembly is in the collapsed position is configured to be stowed without the wheelchair.

14. The foldable stowage cart of claim 13, further comprising a waste collection assembly having a fire containment bag, the fire containment bag for receiving and retaining disposable waste, the waste collection assembly configured to be received and retained on the foldable stowage cart when the end assembly is in the upright position and the foldable stowage cart is without the collapsed wheelchair.

15. A method for receiving a collapsed wheelchair within a stowage bay configured for a service cart onboard an aircraft, the method comprising:
   collapsing a personally owned wheelchair;
   receiving and retaining the personally owned wheelchair on a stowage cart;
   moving the stowage cart with the personally owned wheelchair thereon through an aisle of the aircraft;
   receiving and retaining the stowage cart with the personally owned wheelchair thereon in the stowage bay; and
   configuring an end assembly of the stowage cart between an upright position and a collapsed position.

16. The method of claim 15 further comprising removing the stowage cart from the stowage bay and receiving and retaining the service cart in the stowage bay in place of the stowage cart.

17. The method of claim 15 further comprising removing the personally owned wheelchair from the stowage cart and receiving and retaining a waste collection assembly on the stowage cart in place of the personally owned wheelchair.

18. The method of claim 17 further comprising collecting disposable waste within a fire containment bag.

\* \* \* \* \*